United States Patent [19]

Schiepe

[11] 4,067,457
[45] Jan. 10, 1978

[54] STACKING ARRANGEMENT FOR PLANK AND BOARD PIECE GOODS, PARTICULARLY PROFILE STRIPS

[75] Inventor: Heinz Schiepe, Berlin, Germany

[73] Assignee: Firma Heinz Schiepe, Holzbearbeitungs-Maschinen und Automaten, Berlin, Germany

[21] Appl. No.: 744,979

[22] Filed: Nov. 24, 1976

[30] Foreign Application Priority Data

Nov. 27, 1975 Germany .............................. 2445536

[51] Int. Cl.$^2$ .............................................. B65G 57/26
[52] U.S. Cl. .................................. 214/6 M; 214/6 DK
[58] Field of Search .................... 214/6 F, 6 M, 6 DK

[56] References Cited

U.S. PATENT DOCUMENTS

| 1,705,570 | 3/1929 | Horstkotte | 214/6 M |
| 3,703,965 | 11/1972 | Coats | 214/6 M |
| 3,860,128 | 1/1975 | Lunden | 214/6 M |
| 3,904,044 | 9/1975 | Lunden | 214/6 M |
| 3,904,047 | 9/1975 | Lunden | 214/6 M |

Primary Examiner—Lawrence J. Oresky
Assistant Examiner—Ross Weaver
Attorney, Agent, or Firm—Max Fogiel

[57] ABSTRACT

A stacking arrangement for lumber items in the form of planks and boards, particularly profile strips, in which at least two stacking units and a stacking element hold the lumber items. The stacking units and stacking element are movable vertically relative to one another, and the stacking element has a horizontally movable support arm and a transport device for conveying the lumber and depositing it on the support arm. A cylinder piston unit and a pivoted pawl is operably associated with the support arm and transport device. The support arm has a groove open upwardly to accommodate intermediate sticker layers which separate layers of the lumber items and to engage the free end of the pawl. The bottom surface of said groove and the upper surface of said support arm are inclined downwardly and forwardly to form a predetermined angle with the horizontal. The cylinder piston is located above the support arm, and the free piston rod end, facing the stacking element, mounts the pivoted pawl as well as a stop for the pawl. The pawl is stopped hanging vertically during a transport movement.

17 Claims, 9 Drawing Figures

STACKING ARRANGEMENT FOR PLANK AND BOARD PIECE GOODS, PARTICULARLY PROFILE STRIPS

BACKGROUND OF THE INVENTION

The present invention relates to a stacking arrangement for planks and boards, particularly profile strips, with at least two stacking units and a stacking element holding the lumber. The stacking arrangements and stacking element can be moved relative to one another; each of the stacking elements has a movable support arm and a transport device for the lumber to be deposited on the support arm.

With a known stacking arrangement of the preceding species, the transport device comprises a slide actuated by a lift magnet. The slide moves the lumber to be stacked onto the extended support arm. After filling a stacked row, before pulling back the support arm, a retainer is moved vertically by means of another lift magnet; this retainer secures the lumber stacked row against a return movement together with the returning (retracting) support arm. This known stacking arrangement, furthermore, requires a relatively cumbersome control device because slide and retainer are separate components whose consequent co-ordination requires additional control elements. If the stacked rows that are stacked on the stacking element, e.g., an ordinary pallet are separated from one another by intermediate sticker layers which are placed on the support arms by hand or by means of a suitable magazine, there is danger that during retraction of the support arms the intermediate layers are also pulled back, since the retainer only grasps the lumber (to be) stacked.

When using the known stacking arrangement, there have been additional difficulties at the instant of retraction of the support arm with simultaneous deposition of the intermediate layers with the profile strips. Due to a certain distance between the surface of the stacked row deposited last and a certain thickness of the support arm, the row to be deposited now must be lowered by the sum of these two amounts during retraction of the support arms. After a partial retraction of the support arm, there results a tilting of the intermediate layer with the profile strips around the leading edge of the support arm. At this instant there is danger that profile strips, particularly those with smooth surfaces are displaced on the intermediate layers and possibly might even slide off. Particularly when stacking the profile strips with interstices there is the danger that the interstices formed during deposition of the profile strips on the intermediate layers resting on the support arms may be changed or may be closed up altogether.

There also have been difficulties during insertion of the intermediate layers in the magazines. In particular, there have been problems with the insertion of the intermediate layers into the groove of the support arm when the cross-section of the intermediate layers was not square but rectangular.

It is, therefore, an object of the present invention to provide a stacking arrangement of the initially mentioned type which as a transporting device requires only a simple control device which gives absolute certainty that during retraction of the support arms, the intermediate layers are not retracted also, and which further makes sure that during deposition of a stacked row on the support arms onto the stacked row already deposited, there is no shifting of the profile strips on the intermediate layers. The insertion of the intermediate layers into the magazines and into the groove of the support arm is also to be simplified.

Another object of the present invention is to provide a stacking arrangement of the foregoing character which may be economically fabricated and readily maintained in service.

A still further object of the present invention is to provide a stacking arrangement, as described, which has a substantially long operating life.

SUMMARY OF THE INVENTION

The objects of the present invention are achieved by providing that a cylinder piston unit and a pivoted pawl is assigned to the support arm as transport device. In the support arm, to accommodate intermediate layers and to engage the free end of the pawl, a groove, open on top, is provided. The upper surface and the bottom surface of the groove of the support arm in the direction of its free end makes an angle with the horizontal. The transport device, which comprises the cylinder piston unit and which is an element easy to control and inexpensive to manufacture, can be used for shifting the lumber on the support arms and for the retention of the lumber stacked in a row when the support arms are retracted. In the preferred embodiment where the pawl is located at the piston rod end, the pawl contacts its stop both during a transport movement of the cylinder piston unit and when retaining the stacked lumber, with the piston rod extended. This stop serves as an abutment and holds the pawl in an interlock position. Because the pawl engages the groove machined into the support arm, and the intermediate layers are located in this groove, the intermediate layers can be advanced by the required distance and can be retained during the retraction of the support arms. If an intermediate layer is inserted into the groove with the support arm retracted, the pawl, because of its pivotable mounting, can pivot away from the stop so that the support arms with inserted intermediate layer can be moved underneath and past the pawl. Hence, the pawl must perform three functions;

1. During a transport movement of the cylinder piston unit, advancing the lumber, with the pawl at the stop.

2. With extended piston rod and during retraction of the support arms, retention of the lumber and of the intermediate layers, with the pawl again at the stop.

3. During extension of the support arm, together with an intermediate layer inserted in the groove, free passage of the support arm with the intermediate layer, with the pawl being pivoted away from the stop. This is accomplished automatically by the intermediate layer hitting the free end of the pawl.

In another embodiment, where the pawl is pivotably mounted on the stacking unit, the function of advancing the lumber is directly performed by the free end of the cylinder piston unit. The other functions of the pawl remain as before.

The upper surface and the bottom surface of the groove of the support arm in the direction of its free end make an angle with the horizontal. As a result, during retraction of the support arms, with simultaneous deposition of the stacked row formed on the intermediate layers on top of the previously deposited stacked row, there is no tilting around the leading edge of the support arms, so that the danger of shifting of the profile strips on the intermediate layers is remedied.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The stacking arrangement comprises a base frame 1, several side stands 2 movable along this frame, stacking carts 4, movable vertically along this frame and forming stacking units, a feeder track in the form of a roller track 6, and a pallet 7 acting as stacking element. The number of side stands 2 depends on the type of piece goods which is shown in the form of profile or molding strips 8. With long and heavy piece goods, more than two side stands 2 are provided.

Figure 1:
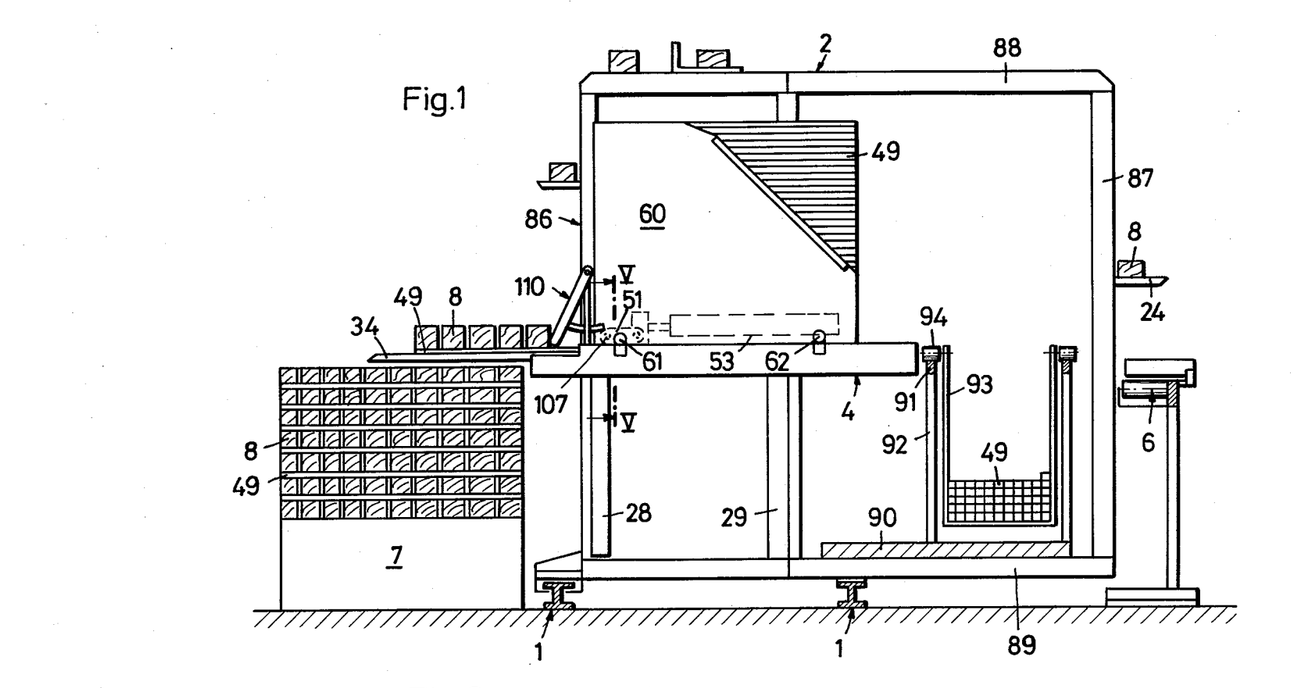
FIG. 1 shows a cross-section through the stacking arrangement of the first embodiment with the section taken between two side stands with stacking units vertically movable on (or along) them.

The side stand 2 in accordance with the embodiment in FIG. 1 comprises a frame 86, equipped with guides 28, 29 for the stacking cart 4 and its drive (not shown), a column 87 a distance away, and upper and lower connecting beams 88, 89. These are connected with the column 87 and the frame 86 to form a rigid framework constituting the side stand 2. Entrainment means 24 are arranged on chains (not shown) around the front side of the frame 86, its upper side, the upper connecting beam 88, column 87, the lower connecting beam 89 and the bottom side of frame 86. These engaging means take the profile strips 8 from the roller track 6 and guide them around the side stand 2 for deposition on the pallet 7.

Through this design of side stand 2, there is formed between the frame 86 and the column 87 a walkway which passes through all side stands 2 of the stacking arrangement and which may have a walk-on grating 90. The walking area has a guide track formed from two parallel guide bars 91 and support rods 92. Between them, a supply cart 93 for the square-rod shaped intermediate sticker layers 49 travels on rollers 94 which roll along guides 91.

Through the walking area between the frame 86 and the supports 87 of side stands 2 of the stacking arrangement, the magazines 60 of stacking carts 4 can be supplied even if access from the rear side of the stacking device, on which the roller track 6 is located, is prevented by long profile strips 8.

Figure 6:
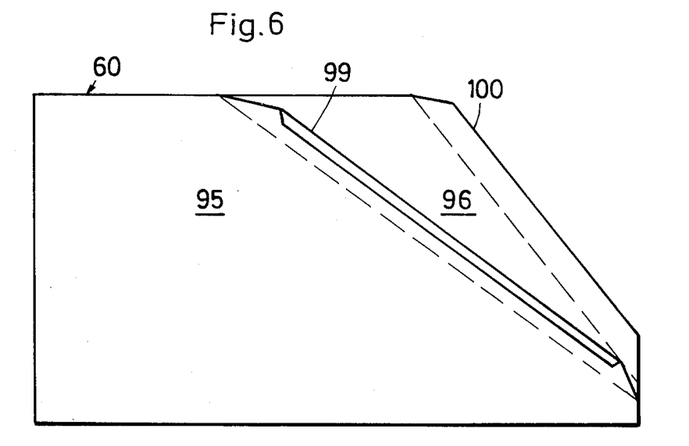
FIG. 6 shows a top view of the magazine of the stacking unit of FIG. 1 at a larger scale.
Figure 7:
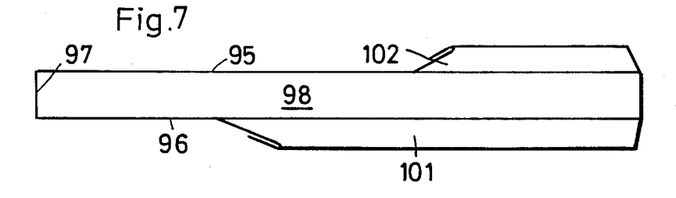
FIG. 7 shows a top view of the magazine of FIG. 6.

The magazine 60, located above the support arm 34 of the stacking cart 4 and next to support arm 34, for receiving the plank-shaped intermediate layers 49, in the embodiment of FIGS. 1, 6 and 7 is made up of two side walls 95, 96, a narrow front wall 97 and a narrow bottom section 98. The two side walls 95, 96 at the open rear side of the magazine 60 of provided with oblique surfaces 99, 100 of different slopes having boundary (rim) areas that are angled towards the outside as narrow margins (strips) 101, 102. As shown in FIG. 6, the oblique surface 99 of side wall 96 is inclined at a smaller angle with the horizontal than the oblique surface 100 of side wall 95. This, in conjunction with the narrow margins 101, 102, facilitates easy insertion of the intermediate layers 49 in magazine 60.

Figure 3:
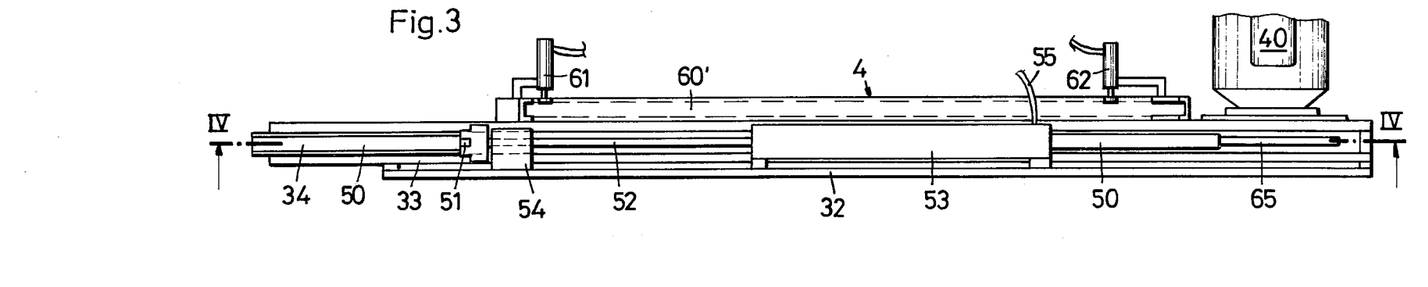
FIG. 3 shows a top view on a stacking unit with support arm, transport arrangement and magazine.
Figure 4:
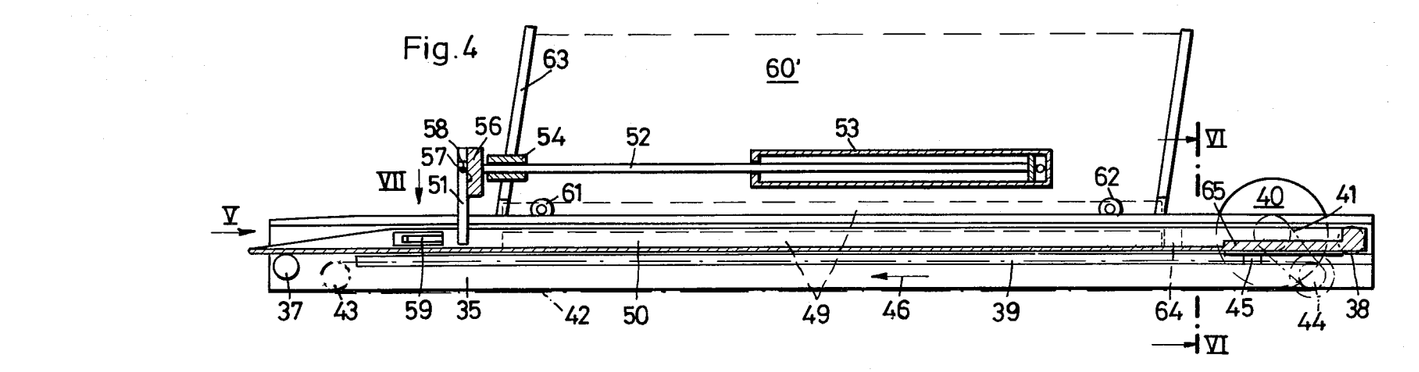
FIG. 4 shows a side view of the stacking unit of FIG. 3.

In the embodiment of FIGS. 3 and 4, the magazine 60' has guideways from U-sections 63 whose open sides face each other and are arranged on the stacking unit parallel, spaced apart by the length of the intermediate layers 49; the guideways make an angle with the vertical and the spacing between guideways is adjustable.

Figure 5:
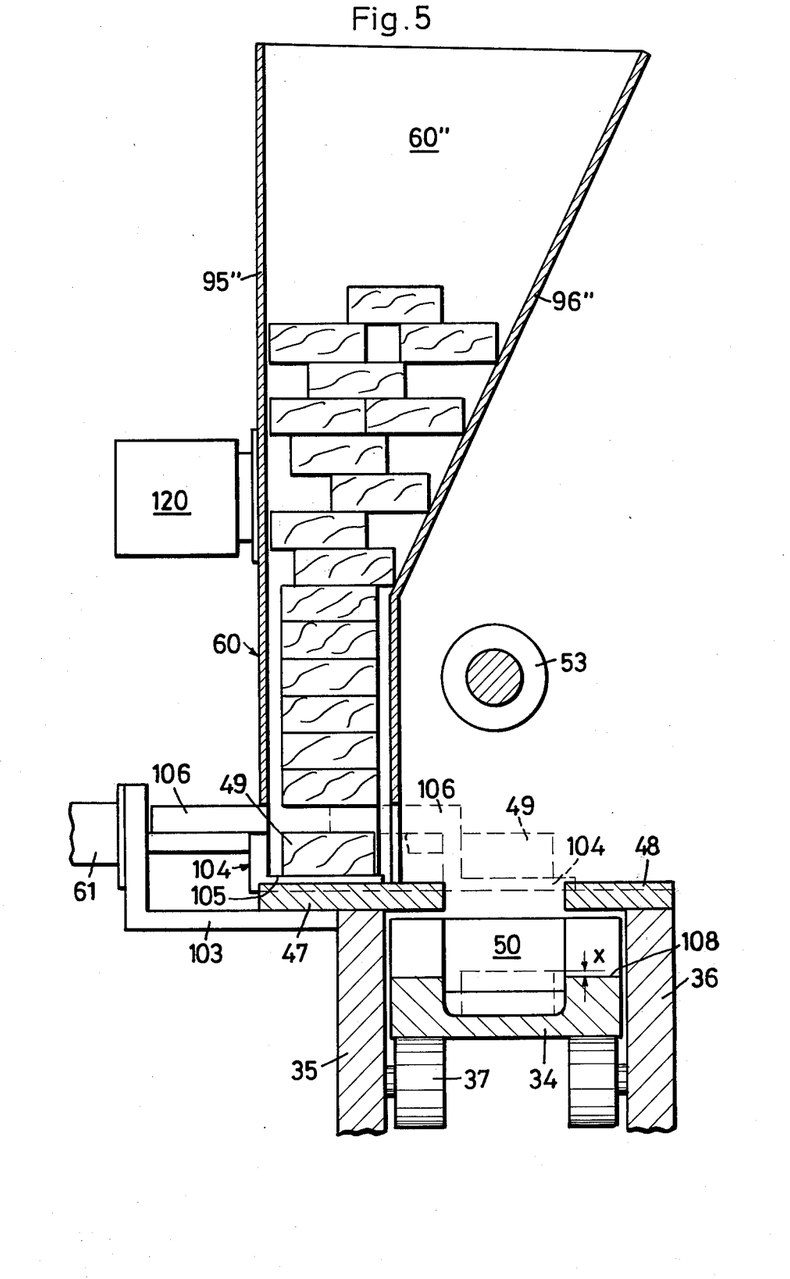
FIG. 5 shows a simplified section taken along line V—V in FIG. 1, directly in front of a cylinder piston unit for inserting the intermediate layers stored in the magazine into the groove of the support arm.

In the embodiment of FIG. 5, the magazine 60" is formed by two funnel-like side walls 95" and 96" whose distance from each other decreases from a multiple of the width of an intermediate layer 49 at the upper opening to the width of one intermediate layer 49. For sorting the intermediate layers 49, placed in the upper opening in random order, side wall 95" of magazine 60" has a vibration device 120 through which the freely suspended magazine 60" is set in vibrations which bring about automatic sorting of the intermediate layers 49 in the lower chute of the magazine 60". The latter is adapted to the width of intermediate layers 49.

The stacking cart 4 shown in FIGS. 3 and 4 has a bottom plate 32 via which it is connected (in a manner not shown) to the guideways 28, 29 of side stand 2 and to a chain drive (not shown). The latter moves the stacking cart 4 vertically along the side stand 2. Rigidly connected to the bottom plate 32 is a jib (cantilever) 33 which guides the movable support arm 34. The jib 33 comprises two support plates 35, 36 (FIG. 5) between which the support arm 34 is guided. Guidance is achieved by rollers 37, 38 and guide strips 39 on which run the rollers 38 mounted rotatably on the support arm 34. The rollers 37 are bearing-mounted on the support plates 35, 36. The support arm 34 is driven by a drive motor 40, controlled by a control device 20, a gear reduction drive 41 and an additional chain drive 42 which has two sprocket wheels 43, 44 mounted on the ends of the support plate 35. The chain of the chain drive 42 is rigidly connected at a projection 45 to the bottom side of support arm 34, so that the latter during a movement of the chain drive moves in the direction of arrow 46. The jib 33 is terminated in the upward direction by guide rails 47, 48 which run parallel to each other, leaving a space in between.

To accommodate intermediate layers 49, which are shown by broken lines in FIG. 5, support arm 34 has a groove 50 which extends nearly throughout the entire length of support arm 34. The width of groove 50 is adapted to the dimensions of intermediate layer 49. A pawl 51 engages groove 50. This pawl is fastened with a pivot joint to the free end of a piston rod 52 of a cylinder piston unit 53 serving as transport device. The cylinder piston unit 53 is fastened with its cylinder to the bottom plate 32. The piston rod 52 slides in a bearing 54 which also is mounted on the bottom plate 32. The cylinder piston unit 53 operates pneumatically; it can be operated via a connecting line 55, controlled by the control device.

In the embodiment shown in FIGS. 3 and 4, the pawl 51 pivots in a head section 56 which has a stop face 57 for the vertically hanging pawl 51. The pawl 51 can only be pivoted clockwise around its fulcrum 58; rotation counter-clockwise is prevented by the stop face 57. The head section 56 also contains boreholes (drill holes) for mounting a mating profile (not shown) for supporting the profile strips 8. The mating profile (in a manner not shown) has the profile negatively mating that of the profile strips 8.

FIG. 4 shows clamping springs 59 in the groove 50 on the free end of the support arm 34. The clamping springs 59 extend through lengthwise slots of the side walls of support arm 34 and are used for the automatic retention (holding) of intermediate layer 49. The clamping springs 59 are made of commercial spring steel strip.

In the embodiment of FIG. 1, the pawl 51, mounted pivotably on the free piston rod end, is guided via rollers 107 on the upper surface 108 of support arm 34. The pawl 51, with a projection extends with its free end into the groove 50 of support arm 34.

In one embodiment (not shown), the pawl 51 is pivotably mounted on the stacking unit formed by the stacking cart 4 and has the form of an angle whose one leg extends into the groove 50 of support arm 34. With this embodiment the cylinder piston unit 53 is located next to the support arm and the free end of the cylinder piston unit 53 acts on the profile strips.

In order to slide the intermediate layers 49 from the magazine 60, 60', 60" into the groove 50 (open at the top) of support arm 34, two cylinder piston units 61, 62 are located on the side of stacking cart 4. These cylinder piston units are fastened, via angle plates 103 underneath one of the guide rails 47, 48 which, in turn, are mounted on the vertical support plates 35, 36 on which the rollers 37 for guiding the support arm 34 are located. The piston rod of cylinder piston unit 61 mounts an L-shaped support element 104 whose horizontal leg 105 (FIG. 5) slides under the action of the cylinder piston unit 61 in a groove of guide rail 47. The other cylinder piston unit 62 does not have such a support element 104, but has only a plunger (not shown) on the free end of the piston rod.

When sliding a plank-shaped intermediate layer 49 into the groove 50 of support arm 34, both cylinder piston units 61 and 62 are actuated simultaneously where the support element 104 can be moved into the broken-line position in FIG. 5 above the support arm, together with the intermediate layer 49. Since the cylinder piston unit 62 does not have a support element 104, the intermediate layer 49 at its end where the cylinder piston unit 62 acts, drops into the groove 50 of support arm 34. However, it is held in its position by the support element 104 so that it is fixed in a very well defined position with respect to the groove 50 of support arm 34. If subsequently the support element 104 is pulled back under the action of the cylinder piston unit 61, the intermediate layer 49 drops into the groove 50 of support arm 34. Since on its one end it is already guided by the groove 50, it cannot turn or twist any more inside the groove. The shape of support element 104 on cylinder piston unit 51 is easy, especially with intermediate layers 49 whose cross-section is rectangular.

In order to avoid that the subsequent intermediate layer hits the piston rods of cylinder piston units 61, 62, they may be provided with upper sliders 106 which, with the piston rod extended, engage the next intermediate layer 49 remaining in the magazine 60.

Figure 2:
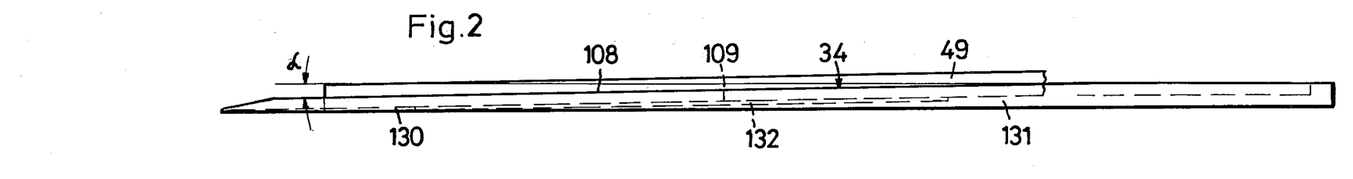
FIG. 2 shows a side view of the support arm of a stacking unit at a larger scale.

In order to deposit a stacked row formed by the intermediate layers 49 lying in the groove 50 of support arms 34 on the stacked row already deposited on pallet 7 without any sliding displacement of the individual profile strips 8 of the stacked row, the upper surface 108 and the bottom surface 109 of groove 50 of support arm 34 are inclined in the direction of the free end at an angle α with the horizontal (see FIG. 2). In addition, the lengthwise axis of the cylinder piston unit 53, carrying the pawl, is parallel to the inclined upper surface 108 and to the bottom surface 109 of groove 50 of support arm 34, so that also the lengthwise axis of the cylinder piston unit 53 makes an angle α with the horizontal. This inclination of the upper surface 108 and of the bottom surface 109 of groove 50 of support arm 34 facilitates uniform deposition of a stacked row on the support arm 34, without this row tilting about the front edge of support arms 34, thus causing a displacement of the individual profile strips 8 of this stacked row.

Figure 8:
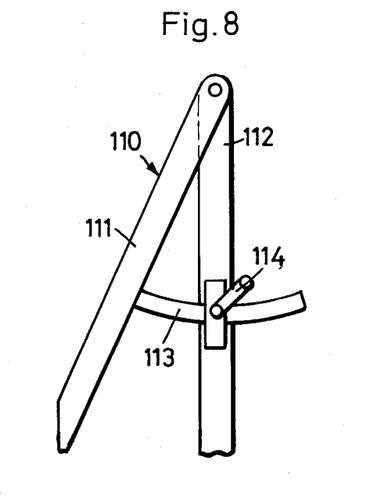
FIG. 8 shows a simplified enlarged view of a diverter for the profile strips.

The conveyors with entrainment means 24 for the profile strips 8 travel around the side stands. In order to deposit the profile strips at a certain location on the intermediate layers 49 located in the grooves 50 of support arms 34 and projecting beyond the upper surface of these support arms, and to achieve a uniform spacing of the deposited profile strips 8 during the stepwise outward travel of the support arms 34, at least two diverters (deflectors) 110 are provided on the stacking arrangement. (FIGS. 1 and 8). They are located in the embodiment shown on stacking cart 4. However, they may also be directly attached to the side stands. The diverters 110 comprise a diverter arm 111 which hinges on a column 112 and can be adjusted, by means of strip 113, to make an angle with the vertical. A screw toggle device 114 is used for the adjustment. For gently depositing the profile strips 8, the free end of the diverter arm 111 is rounded off. In the embodiment shown, the column 112 of the diverter 110 is fastened to the stacking cart 4 itself. It may also be placed on the side stand 2 a distance away from the stacking cart. In this case, caused by vibration of the profile strips to be deposited, there may be a displacement of the profile strips before deposition.

It is essential to the invention that the support arms 34, under the action of drives not shown or described, can be moved both at a uniform rate, i.e., during extension fast and during retraction slow, and stepwise, and that the intermediate layers 49 which lie in the grooves 50 of support arms 34, project with their upper surfaces beyond the upper surface of support arm 34 by a certain amount so that the profile strips 8 to be deposited do not touch the upper surface of support arms 34. The smooth deposition of strips 8 in a stack at desired intervals, forming air gaps required for drying the wood, is aided during stepwise extension of the support arms 34 by the diverter arms 111, since these make possible a so-called rear-edge positioning of the profile strips 8. During the stepwise extension of support arms 34, the cylinder piston unit 53 with its pawl 51 essentially serves only to grasping the intermediate layers during the retraction of the support arms 34 during which process one stacked row is deposited.

In the embodiment of FIG. 2, the bottom surface 109 of groove 50 of support arm 34, to form two spaced contact surfaces 130, 131 for the intermediate layer 49 in the groove 50, is provided with a recess 132 so that even slightly curved or oblique intermediate layers are in the groove 50 of the support arm.

Figure 9:
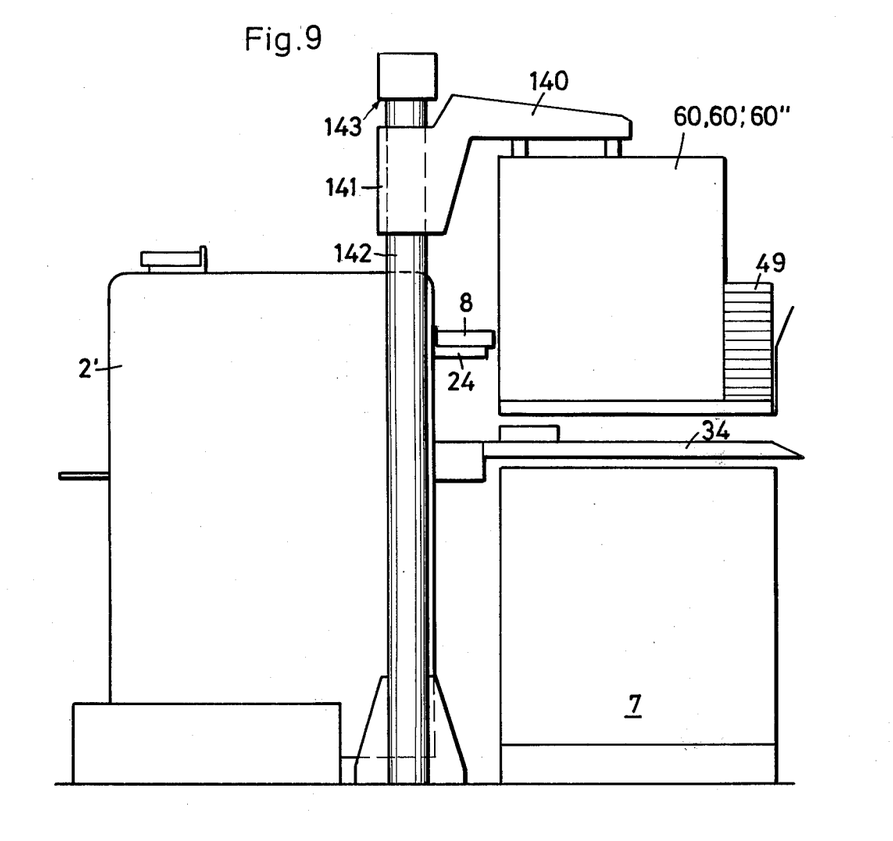
FIG. 9 shows a cross-section similar to FIG. 1 through a different stacking unit.

In the embodiments of the stacking arrangement described so far the magazines 60, 60', 60" were connected to the stacking cart 4. In another embodiment essential to the present invention, the magazines 60, 60', 60" are located away from the stacking cart 4 above the stacking element 7 on a vertically travelling magazine cart 140 (FIG. 9). This embodiment of the stacking arrangement is used when the goods to be stacked are long and a large number of intermediate layers 49 is required, whereas for depositing the items to be stacked, only two stacking carts 4 with one support arm 34 each are required. In this case, several magazines 60, 60', 60" are located on the magazine cart between the stacking carts 4. For this purpose, the magazine cart 140 extends above the stacking element 7. One lateral roller cart 141, each of the magazine cart 140, can travel vertically on vertical columns 142 of a magazine frame 143. The columns 142 are always located outside the two outer side stands 2'.

With this new construction of a stacking arrangement, comprising the three construction elements, sidestand 2 with stacking cart 4 and support arms 34, the stacking element 7 and the magazine frame 143 with columns 14, magazine carts 140 and magazines 60, 60', 60", any type of magazine 60, 60', 60" can be used. The magazines 60, 60', 60", as shown in FIG. 5, have a bottom plate 47 above which the intermediate layers 49 are slid out laterally. Naturally, the remaining items shown in FIG. 5 for guiding the support arm 34 are not contained in these magazines.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A stacking arrangement for lumber items in the form of planks and boards, particularly profile strips, comprising: at least two stacking units and a stacking element holding the stacked lumber items; means for moving said stacking units and stacking element vertically relative to one another; said stacking units each having a horizontally movable support arm and a transport device for, conveying the lumber and depositing it on the support arm, one cylinder piston unit, a pivoted pawl mounted on one end of said cyliner piston unit which operatively cooperates with the support arm and the transport device; said support arm having a groove open upwardly to accommodate intermediate sticker layers which separate layers of the lumber items and to permit the engagement of the free end of said pawl with the rear edge of the sticker layers; the bottom surface of said groove and the upper surface of said support arm being inclined downwardly and forwardly to form a predetermined angle with the horizontal in the direction of the forward free end of said support arm.

2. The stacking arrangement as defined in claim 1 wherein said cylinder piston unit is located above said support arm; said piston rod having a free end facing said stacking element and mounting said pawl and a stop for said pawl, said pawl hanging vertically and being stopped during a rearward movement of the support arm.

3. The stacking arrangement as defined in claim 1 wherein said cylinder piston unit is located adjacent to said support arm; said cylinder piston unit having a free end acting directly on the lumber items to be stacked.

4. The stacking arrangement as defined in claim 1 wherein said bottom surface of said groove has a recess to form two spaced contact surfaces for said intermediate layers in said groove.

5. The stacking arrangement as defined in claim 1 including magazines for feeding intermediate sticker layers and cooperating with said stacking units; side stands on which said stacking units travel vertically; a vertically travelling magazine cart for mounting said magazines, said magazines being located separately from said stacking units above said stacking element on said magazine cart.

6. The stacking arrangement as defined in claim 5 including a lateral roller cart; vertical columns on a magazine frame, said lateral roller cart travelling vertically on said vertical columns of said magazine frame, said columns being located outside said side stands.

7. The stacking arrangement as defined in claim 1 including side stands, said transport device comprising chain-guided entrainment means travelling around said side stands, said stacking units being guided by said side stands; said side stands comprising a frame carrying said stacking units, an upper and a lower connecting beam, and a spaced column connected to said frame by said upper and lower connecting beams, said entrainment means passing around the front side of said frame, the upper side of said frame, the upper connecting beam, said column, said lower connecting beam and the bottom side of said frame, a path for supplying magazines with plank-shaped intermediate sticker layers being formed between said frame and said column underneath said upper connecting beam and above said lower connecting beam.

8. The stacking arrangement as defined in claim 7 including a guide track with a supply cart for said intermediate sticker layers and passing through all side stands in said passage.

9. The stacking arrangement as defined in claim 5 wherein said magazines are box-shaped, and have two side walls, a substantially narrow front wall and substantially narrow bottom, said two side walls having oblique surfaces of different inclination at the open rear side of said magazines, said oblique surfaces having rim areas angled towards the outside for forming substantially narrow marginal strips.

10. The stacking arrangement as defined in claim 5 wherein said magazines are formed from two side walls meeting in a funnel-shaped configuration, the space between said side walls decreasing from a multiple of the width of one intermediate sticker layer to the width of the intermediate layer; and vibrating means on said magazines.

11. The stacking arrangement as defined in claim 9 wherein said magazines are located adjacent to said support arm, the intermediate sticker layers being movable horizontally for feeding into said groove of said support arm.

12. The stacking arrangement as defined in claim 11 including cylinder piston units mounted on said magazines for effecting horizontal movement of an intermediate sticker layer; and means for actuating said cylinder piston units when said support arm is retracted.

13. The stacking arrangement as defined in claim 12 wherein said last-mentioned cylinder piston units have piston rods, the free end of a piston rod of one of said cylinder piston units having an L-shaped support element for said intermediate sticker layers; said intermediate sticker layers having plank-elements resting against a horizontal leg of said L-shaped support element.

14. The stacking arrangement as defined in claim 11 wherein said intermediate sticker layers are horizontally movable.

15. The stacking arrangement as defined in claim 1 wherein the transport device includes diverter means depositing profile strips in a predetermined manner on said support arm for attaining a uniform spacing of the profile strips during stepwise extension of said support arm.

16. The stacking arrangement as defined in claim 15 wherein said diverter means comprises at least two diverters having a diverter arm, a column on which said diverter arm is pivoted, said diverter arm being adjustable relative to said column by a selected angle formed with the vertical by a strip member.

17. The stacking arrangement as defined in claim 15 including stacking carts, said diverters being located on said stacking carts and travelling vertically with said stacking carts.

* * * * *